United States Patent

Hatakeyama et al.

[11] Patent Number: 5,820,956
[45] Date of Patent: Oct. 13, 1998

[54] MULTI-LAYER STRUCTURAL BODY

[75] Inventors: Hidetoshi Hatakeyama; Yoshiki Ito, both of Tokyo, Japan

[73] Assignee: Mitsubishi Gas Chemical Company, Inc., Tokyo, Japan

[21] Appl. No.: 494,062

[22] Filed: Jun. 23, 1995

[30] Foreign Application Priority Data

Jun. 24, 1994 [JP] Japan ................................. 6-143391

[51] Int. Cl.⁶ ............................ B32B 27/18; B65D 81/26
[52] U.S. Cl. ....................... 428/36.6; 428/515; 428/516; 428/35.4; 428/518; 428/475.2; 428/474.4; 428/476.3; 428/483
[58] Field of Search ................................. 428/36.6, 515, 428/516, 35.4, 518, 475.2, 474.4, 476.3, 483

[56] References Cited

U.S. PATENT DOCUMENTS

| | | | |
|---|---|---|---|
| 4,536,409 | 8/1985 | Farrell et al. | 428/516 |
| 4,877,664 | 10/1989 | Maeda et al. | 428/35.9 |
| 4,897,274 | 1/1990 | Candida et al. | 428/516 |
| 5,527,570 | 6/1996 | Addeo et al. | 428/35.7 |

FOREIGN PATENT DOCUMENTS

| | | |
|---|---|---|
| 0367390 | 5/1990 | European Pat. Off. . |
| 0466515 | 1/1992 | European Pat. Off. . |
| 6218424 | 1/1987 | Japan . |
| 63-137838 | 6/1988 | Japan . |
| 63-168348 | 7/1988 | Japan . |
| 462858 | 10/1991 | Japan . |
| 460826 | 9/1992 | Japan . |

*Primary Examiner*—Charles Nold
*Attorney, Agent, or Firm*—Leydig, Voit & Mayer, Ltd.

[57] ABSTRACT

A multi-layer structural body for absorbing oxygen and preserving packaged goods adversely affected by oxygen, such as food, includes a first layer resistant to gas permeation; a second layer laminated on the first layer and having a deoxidizing property; and a third layer laminated on the second layer and permeable to air, wherein the first layer has an oxygen permeability of less than 100 cc/m²·day·atm (23° C., 100% RH); the second layer includes a resin having an oxygen permeability coefficient of at least 200 cc·0.1 mm/m²·day·atm (23° C., 100% RH), a granular oxygen absorber composition dispersed in the resin and including a deoxidation material undergoing a deoxidation reaction when exposed to moisture, and a moisture absorber dispersed in the resin, wherein the third layer has an oxygen permeability of at least 100 cc/m²·day·atm (23° C., 100% RH)

22 Claims, 4 Drawing Sheets

MULTI-LAYER STRUCTURAL BODY

BACKGROUND OF THE INVENTION

1. Field of the Invention

The present invention relates to a multi-layer structural body which is obtained by forming and processing resin. More particularly, the present invention relates to a multi-layer structural body which has a superior oxygen absorbing function and superior resistance to gas permeation, and which can be used as a packing material, for example, for food and medicines. Moreover, the present invention relates to a method for manufacturing this multi-layer structural body, and to a container which is made of the multi-layer structural body.

2. Description of the Prior Art

As the technology for preventing a substance to be preserved, such as food and medicine, from suffering, for example, oxidation, deterioration, discoloration, generation of molds, propagation of aerobic bacterium, and vermin damage, the method of placing the substance to be preserved, together with an oxygen absorber, in a package which is resistant to gas permeation has been used. A widely used type of oxygen absorber is an air-permeable, small bag containing an oxygen absorber composition in a powder or granular form. In this specification, the air-permeable, small bag containing the oxygen absorber composition may be called the "small bag containing the oxygen absorber composition" or simply the "small bag." The expression "resistance to gas permeation" or variant expressions thereof used in this specification of the present invention means the property of allowing no gas or a very small amount of gas to permeate through.

However, if the small bag containing the oxygen absorber composition is placed in a package together with a substance to be preserved, the small bag will get mixed with the preserved substance. If the small bag is mixed with the preserved substance, there is a possibility that the small bag may be mistakenly cooked or eaten with the preserved substance. Moreover, such state of the small bag may give a user a strange feeling that some foreign stuff is mixed in, or a user may feel reluctant to use the preserved substance. Furthermore, if a user makes a mistake in handling the small bag and breaks it, the oxygen absorber composition running out of the small bag may contaminate the preserved substance. Therefore, recently, it has been attempted to construct a package made of a packing material which has a deoxidizing performance in order to give the oxygen absorbing performance to the package itself.

As examples of the above-described construction, as disclosed in the official gazettes of the Japanese Patent (Kokoku) Publication No. SHO 62-1824, the Japanese Patent Laid-Open (Kokai) Publication No. SHO 57-146651, the Japanese Patent Laid-Open (Kokai) Publication No. HEI 4-45152, and the Japanese Patent Laid-Open (Kokai) Publication No. HEI 4-90848, there are films or sheets of multi-layer construction including a layer in which an oxygen absorber composition is dispersed in resin.

Moreover, the official gazette of the Japanese Patent (Kokoku) Publication No. HEI 4-60826 discloses a packing container made of thermoplastic resin which is resistant to gas permeation and which contains an oxygen absorber composition sold on the market. The official gazette of the Japanese Patent (Kokoku) Publication No. HEI 4-62858 discloses a container including a material which exhibits its oxygen acquisition function only when it is exposed to high temperatures and high water vapor pressure in a retort treatment. These official gazettes of the Japanese Patent (Kokoku) Publication No. HEI 4-60826 and the Japanese Patent (Kokoku) Publication No. HEI 4-62858 disclose the technology for restraining the resistance to oxygen permeation of the gas-permeation-resistant resin from lowering at the time of a retort treatment, thereby preventing oxygen from leaking into the container from outside.

However, compared to the prior art in which the small bag is placed together with the preserved substance in a package, the prior art in which the package itself is given the oxygen absorbing performance, is extremely inferior in its oxygen absorbing performance and there is a problem that oxygen existing in the package cannot be removed efficiently in a short period of time.

As for the above-mentioned multi-layer structural body, if the oxygen-free absorber composition contained in the small bag is simply kneaded into resin, there exists resin between each component particle of the oxygen absorber composition and, therefore, it is very difficult for the particles of the oxygen absorber composition to directly contact each other. Moreover, oxygen and water, etc. which are involved in the oxygen absorption reaction cannot move to and from the particles of the oxygen absorber composition without passing through molecules of the resin. This is a material factor which hinders the progress of the oxygen absorption reaction, resulting in a problem that sufficient speed of the oxygen absorption reaction cannot be obtained. Also, since the composition cannot be dispersed well in resin, it is possible to blend the composition in a very large proportion to the amount of resin so that the composition will contact the resin sufficiently. However, this may cause many problems in the formation of the resin.

It is necessary to try to enhance the oxygen absorbing capability of a multi-layer structural body by improving the blending of the oxygen absorber composition, the construction of the members of the multi-layer structural body, etc. However, if a multi-layer structural body with a strong oxygen absorbing capability is used, there is a problem that its oxygen absorbing capability will gradually become lower during the storage period of a package (such as a container, lid, or bag) molded from the multi-layer structural body, before it is actually used. Of course, if the multi-layer structural body itself is stored in atmospheric air for a long time, not only the oxygen absorbing performance lowers, but also it results in the problem that when such multi-layer structural body is molded into a package by a thermoforming method such as sheet forming, vacuum forming, or pressure forming, the multi-layer structural body bubbles at the time of thermoforming and the surfaces of the multi-layer structural body become uneven.

The above-described problems are caused because the oxygen absorption reaction requires moisture and the oxygen absorber composition tends to easily take in moisture which is essential to the reaction. There is another problem in that high oxygen absorbing performance cannot be acquired without using an oxygen absorber composition which easily takes in moisture and has a strong hygroscopic property. Accordingly, as the oxygen absorbing performance of the multi-layer structural body increases, the multi-layer structural body becomes capable of absorbing oxygen more easily. Hence, after the multi-layer structural body is molded into a final usage form, it absorbs oxygen even with a very small amount of moisture absorbed, thereby lowering the oxygen absorbing capability.

As another cause for the moisture absorption of the multi-layer structural body, there is the factor that component members of the multi-layer structural body also absorb moisture, although the effect is less than in the case of the oxygen absorber composition. If ethylene-vinyl-alcohol-copolymer or various kinds of nylon films which have a hygroscopic property are used as gas-permeation-resistant materials in the multi-layer structural body, there is the problem that the moisture absorbed during the storage period of the multi-layer structural body will hinder the thermoforming processing of the multi-layer structural body.

As a measure for solving the above-described problems due to moisture absorption of the multi-layer structural body, it is possible to pack the multi-layer structural body by utilizing, for example, metallic can sealing technology, of which resistance to gas permeation is said to be perfect, or heat sealing technology with the use of a heat sealing bag with metallic foil layers. However, the films or sheets in the multi-layer structure are often stored, for example, in a wound roll which weighs hundreds of kilograms. Therefore, there are many problems in strength, workability, and the necessary facilities. Moreover, when the multi-layer structural body is formed in the shape of, for example, a container, it is bulky and, therefore, it may contain a large amount of air when it is packed, it is therefore inefficient. In addition, since the shape is complicated, there is the possibility that pin holes may be generated if the multi-layer structural body is packed in a gas-permeation-resistant bag. In addition, there are other problems such as bad workability and high cost.

As another measure to solve the problems, it may be possible to place a desiccant such as silica gel or zeolite in a package together with the multi-layer structural body. However, in this case, this approach is not effective at all. The desiccant works effectively only when the substance to be placed in a package together with the desiccant has a much weaker hygroscopic property than that of the desiccant, or when moisture absorbed by the substance is absorbed again by the desiccant. In this case, however, the oxygen absorber composition has a strong hygroscopic property and the moisture, once absorbed, will be consumed in a chemical reaction. Therefore, the desiccant does not work effectively.

SUMMARY OF THE INVENTION

The present invention aims to solve the above-described problems. An objective of the invention is to provide a multi-layer structural body which has the function to absorb oxygen actively and efficiently just like a conventional small bag containing the oxygen absorber composition.

Another objective of the invention is to provide a multi-layer structural body with improved thermoforming capability.

A further objective of the invention is to provide a multi-layer structural body with improved preservability, which does not exhibit its oxygen absorbing capability until it is actually used.

Still another objective of the invention is to provide a method of easily enabling the manufacture of the multi-layer structural body which attains the above-described objectives. Moreover, an objective of the invention is to provide a package made of the aforementioned multi-layer structural body.

The inventors of the present invention made, as a form of the oxygen absorber composition to be mixed in the resin, all the components of the oxygen absorber composition, excluding moisture, contained in one grain of the oxygen absorber composition, thereby solving the aforementioned problems in the prior art.

The inventors of the present invention blended, as a form of the oxygen absorber composition to be mixed in the resin, all the oxygen absorbing components, which exhibit a deoxidation reaction when moisture is supplied thereto, in one grain of the oxygen absorber composition, thereby succeeding in removing obstacles to the oxygen absorption reaction progress and in obtaining a practical oxygen absorbing speed. Moreover, the hygroscopic property becomes stronger as the oxygen absorbing speed increases, which results in various problems such as bubbling, at the time of thermoforming, of the multi-layer structural body after being stored, and lowering of the oxygen absorbing function. The inventors of the present invention have solved these problems by adding an alkaline earth metal oxide, thereby succeeding in enhancing the preservability of the multi-layer structural body.

Furthermore, the inventors of the present invention discovered that formability under special thermoforming conditions can be improved by controlling the softening state of the resin. They also discovered a resin composition which makes the multi-layer structural body absorb oxygen faster and which also enhances its appearance. Accordingly, they remarkably improved the practical functions of the multi-layer structural body in a sheet form and resolved the aforementioned conventional problems.

The resin composing a second layer (the layer containing the oxygen absorber composition) itself is required to be permeable to oxygen (oxygen permeability coefficient: 200 cc·0.1 mm/m$^2$·day·atm (23° C., 100% RH) or more) in order to allow the oxygen within the package to efficiently reach the oxygen absorber composition.

When the multi-layer structural body is formed into the package in the shape of a container or bag, a first layer which forms the outside wall of the package is required to have the performance of preventing oxygen from penetrating into the package from outside. Moreover, the third layer which forms the inside wall of the package is required to have the performance of impeding the direct contact of the second layer with the preserved substance and of performing rapid and efficient oxygen permeation. Namely, the first layer is required to have as small an oxygen permeability as possible (oxygen permeability: less than 100 cc/m$^2$·day·atm (23° C., 100% RH), while the third layer is required to have as large oxygen permeability as possible (oxygen permeability: 100 cc/m$^2$·day·atm (23° C., 100% RH) or more).

The construction of the first and third layers is not limited to a single layer construction, but can be a multi-layer construction including, for example, adhesive layers. Moreover, when an inside bag is additionally placed inside of the package, or when the package is further wrapped with a film or a case, it is necessary to determine the oxygen permeability of the first and third layers in consideration of the layer construction.

The multi-layer structural body with the oxygen absorbing performance of the present invention in the above-described construction has a sufficient oxygen absorbing function and is capable of exhibiting its function without any special treatment such as high temperature treatment, just like when a conventional small bag containing the oxygen absorber composition is used. Even if heat sterilization, retort treatment, high temperature packing (hot bag) of the preserved substance, etc. are performed after the preserved substance is placed in the package formed of the multi-layer structural body, such performance does not hinder the preservation of the substance at all. Furthermore, if the environmental temperature rises, the speed of the oxygen absorption reaction and the oxygen permeability of the first and second layers also increases, thereby resulting in a more rapid oxygen absorbing function.

The first layer forms the outermost layer of the package when the package is manufactured by using the multi-layer structural body of the present invention. This first layer consists of one or more layers. Regardless of the film thickness of each layer and the existence of adhesives, the first layer is required to have an oxygen permeability less than 100 cc/m$^2$·day·atm (23° C., 100% RH). More preferably, it is desirable that the oxygen permeability of the first layer is 50 cc/m$^2$·day·atm (23° C., 100% RH) or less. Namely, it is desirable to make the oxygen permeability of the first layer as low as possible within the allowable range concerning the processing steps, costs and other factors. When the package is manufactured by using the multi-layer structural body of the present invention, such small oxygen permeability of the first layer makes it possible to reduce the amount of oxygen permeating into the package from outside and to reduce the amount of oxygen absorber composition to be used. Moreover, the oxygen absorbing performance of the package can be maintained even longer.

As examples of the resin which composes the first layer, the following types of resin can be preferably used: polyolefin such as polyethylene and polypropylene, and modified forms thereof; polyester such as polyethylene terephthalate; polyamide such as nylon 6, nylon 66, and MX nylon; and ethylene-vinyl-alcohol-copolymer, polyvinyl chloride, and polyvinylindene chloride. The first layer may be made in a single layer or in multiple layers in combination with layers made of the above-mentioned resin. Resin made by orientation processing may also be used.

Moreover, it is possible to mix additives such as fillers, coloring agents, antistatic agents, and stabilizers in the first layer. Specifically, mixing coloring agents such as dyestuffs and pigments in the resin which composes the first or third layer conceals the second layer, makes the appearance of the package tidy and, therefore, is important because it makes the package marketable.

The first layer can be formed by methods such as simultaneous extrusion, lamination, thermal shrink packaging, wrap packaging, and outside bag packaging. In the case of simultaneous extrusion, the first layer and the second layer may be extruded together. Moreover, the first layer and the second layer may be glued to each other via an adhesive layer.

As examples of the oxygen absorber composition dispersed in the resin which forms the second layer, a granular reductive substance, which is the main component, of which surface is coated with catalysts or assistants, or a granular form of the mixture produced by mixing and then grinding the reductive substance, which is the main component, and all other components of the oxygen absorber composition, can be preferably used.

As for the reductive substance, which is the main component, metal powder (such as iron powder, aluminum powder and silicon powder), inorganic salts (such as ferrous salt and dithionite), ascorbic acid and salts thereof, catechol, and glycerin, etc. are preferable. This main component is ground with other components and is used as the oxygen absorber composition in a granular form. Among others, it is preferable to use: metal powder with metal halide attached to the surface of the metal powder in a method disclosed in the Japanese Patent No. 1088514; granules of metal powder, metal halide and, if necessary, other additives, all of which are granulated with a binder; and an inorganic carrier obtained by making it absorb an alkali aqueous solution of ascorbic acid and by drying it.

As the aforementioned metal powder, metallic iron is preferable. There are no special limitations, such as purity, on metallic iron as long as it is capable of generating the aforementioned oxygen absorption reaction and can be dispersed in the thermoplastic resin. Even if a portion of the metallic iron is already oxidized or if it is an alloy with other kinds of metals, such metallic iron is available. Preferable examples of the metallic iron are: iron powder represented by reduced iron powder, atomized iron powder, and electrolytic iron powder; ground powder of various kinds of iron products, such as iron powder scattered, that is, turnings, when manufacturing cast iron, cast iron, and powder of steel products; and ground articles. A preferable form of metal powder is a fine grain or fiber form. In the case of the metal iron in fine grain form, when the metal iron grains are dispersed in the thermoplastic resin to form the second layer, a small grain size is preferable because the film thickness of the second layer can be made thin and the surfaces can be made flat and smooth. Specifically, it is preferable to use metallic iron grains with an average grain diameter of 200 $\mu$m or smaller, and more preferably of 50 $\mu$m or smaller. In the case of the metal iron in a fiber form, it is preferable to have the diameter of the metal iron fiber as small as possible because of the same reason as described above.

A metal halide in the thermoplastic resin functions as a catalyst in the oxygen absorption reaction of the metal-iron. As the metal of the metal halide, at least one of the following metals should be selected: alkali metal, alkaline earth metal, copper, zinc, aluminum, tin, iron, cobalt, or nickel. Specifically, lithium, potassium, sodium, magnesium, calcium, and barium iron are preferable. Examples of halogens are chlorine, bromine, and iodine, among which chlorine is specifically preferable.

It is preferable to add the metal halide by methods such that the metal halide will not easily separate from the metal iron in the thermoplastic resin. For examples, the following methods are specifically preferable: the method of grinding and mixing the metal halide by using a machine such as a bowl mill or a speed mill, and of filling a recess on the surface of the metal iron with fine grains of the metal halide; the method of attaching fine grains of the metal halide to the surface of the metal iron by using a binder; and the method of mixing and drying a metal halide aqueous solution and the metal iron and of attaching the fine grains of the metal halide to the surface of the metal iron. In order to confirm that the metal iron and the metal halide are not separated from each other in the thermoplastic resin, it is preferable to conduct an analysis with an electron photo-microanalyser. If component elements of both the iron and the metal halide exist as SEM images in a grain of the metal iron observed by the electron photo-microanalyser, the above-described objective can be considered to have been accomplished.

A preferable amount of the metal halide to be added to 100 parts by weight of the metal iron is 0.1–20 parts by weight. When essentially the entire amount of the metal halide is attached to the metal iron, and when almost no metal halide is free in the thermoplastic resin, 0.1–5 parts by weight of the metal halide is enough for effective functioning.

A granular oxygen absorber composition to be dispersed in the resin forming the second layer is a moisture-dependent type which exhibits a deoxidation reaction when moisture is supplied to it. A desirable initial content of moisture in the oxygen absorber composition is 0.2 wt % or less, and more preferably 0.1 wt % or less. As for the grain diameter, a preferable average grain diameter is 5–200 μm, and more preferably 5–50 μm. Moreover, it is possible to add, other than the oxygen absorber composition, the following additives in the second layer as needed: coloring agents such as organic or inorganic dyestuffs and pigments; dispersing agents such as those of silane or titanate type; water absorptive agents such as polyacrylic-type compounds; fillers such as clay, mica, silica, and starch; and gas absorber such as zeolite and activated carbon.

As for the resin which forms the second layer and in which the granular oxygen absorber composition is dispersed, the following substances are preferable and resin mixtures of the following may also be used: polyolefin such as polyethylene, polypropylene, polybutadiene, and polymethyl pentene, and modified forms thereof; or thermoplastic resin such as graft polymer with silicone resin, ionomer, elastomer, polycarbonate, and polyurethane. A compounding ratio of the oxygen absorber composition in the second layer should preferably be 2–93 wt %, and more preferably 10–70 wt %. If the compounding ratio is too low, the oxygen absorbing performance is reduced. On the other hand, if the compounding ratio is too high, the processibility of the multi-layer structural body is reduced. It is desirable to make the film thickness of the second layer 1000 μm or less, and more preferably 500 μm or less.

The third layer is the innermost layer of the package when the package is manufactured by using the multi-layer structural body of the present invention. The third layer consists of one or more layers. Regardless of the film thickness of each layer or the existence of adhesives, the third layer is required to have the oxygen permeability of 100 cc/m²·day·atm (23° C., 100% RH) or more. More preferably, it is desirable to have an oxygen permeability of 200 cc/m²·day·atm (23° C., 100% RH) or more. Namely, it is desirable to have the oxygen permeability of the third layer as high as possible within an allowable range concerning the processing steps, costs, and other factors. When a package is manufactured by using the multi-layer structural body of the present invention, and when a substance to be preserved is placed in the package, such high oxygen permeability makes it possible to make oxygen and moisture existing in the package penetrate through the third layer and reach the second layer rapidly. Accordingly, oxygen existing in the package can be efficiently and rapidly absorbed by the second layer.

As examples of the resin which forms the third layer, the following substances can be preferably used: polyolefin such as polyethylene, polypropylene, polybutadiene, and polymethyl pentene, and modified forms thereof; or graft polymer with silicon resin; polyester such as polyethylene terephthalate; polyamide such as nylon 6 and nylon 66; and synthetic resin such as ionomer and elastomer. This third layer may be constructed in a single layer or multiple layers in combination with the aforementioned resin layers. Moreover, the third layer may be a mixed resin layer in which the aforementioned different kinds of resins are mixed together. Furthermore, a microporous film of the aforementioned resin on which micropores are formed, or nonwoven cloth may also be used as the third layer. It is also possible to mix additives such as fillers, coloring agents, antistatic agents, and stabilizers in the third layer.

The third layer can be formed by methods such as simultaneous extrusion, lamination, inside bag packaging. In the case of simultaneous extrusion, the third layer may be extruded together with the second layer. If necessary, the third layer and the second layer may be glued to each other via an adhesive layer.

When the multi-layer structural body of the present invention is thermoformed into a package in the shape of, for example, a tray or cup, if the heating temperature is set low in order to enhance the molding cycle, to maintain the appearance and transparency of the multi-layer structural body, and for other purposes, the third layer, which is the innermost layer of the package, sometimes becomes slightly uneven, depending on the heating method of the molding machine. This unevenness takes place because of the following reason: since in the second layer a large amount of the oxygen absorber composition, which has strong thermal conductivity, is dispersed in the resin, the resin existing adjacent to this oxygen absorber composition is rapidly heated; therefore, the resulting differences in the softening property of the resin existing adjacent to the oxygen absorber composition and the resin existing at other positions, the second layer becomes uneven and then the third layer which has already softened takes over the unevenness of the second layer. In many cases, the film thickness of the third layer is made thinner than that of the first layer because of air permeability. Therefore, the third layer tends to more easily receive adverse effects due to the generation of the above-described unevenness. In the present invention, the resin forming the second layer is made to soften at lower molding temperatures, thereby the above-described phenomenon can be prevented. For example, if polypropylene is used as the main component of the sheet, it is preferable to use ethylene-propylene-random-copolymer for the second layer. Moreover, in the case of other kinds of sheets, it is preferable to use, for the second layer, a resin which has a softening temperature no higher than that of the main component resin which controls the moldability at the time of thermoforming.

When the second layer is constructed by dispersing the oxygen absorber composition, which contains metal iron and metal halide, and an alkaline earth metal in a thermoplastic resin, the first step of the oxygen absorption reaction caused by the metallic iron can be expressed in the following reaction formulas:

$$Fe \rightarrow Fe^{2+} + 2e^- \tag{1}$$

$$H_2O + \tfrac{1}{2}O_2 + 2e^- \rightarrow 2(OH)^- \tag{2}$$

$$Fe + H_2O + \tfrac{1}{2}O_2 + 2e^- \rightarrow Fe^{2+} + 2e^- + 2(OH)^- \tag{3}$$

In this case, environmental pH is important. If the alkaline level becomes higher, electron transfer reactions of the above chemical formulas (1) and (2) are hindered, thereby making the reactions hardly progress.

On the other hand, oxides of the alkaline earth metal easily react with water and become strong alkaline hydroxides of the alkaline earth metal.

If the oxygen absorber composition contains an alkaline earth metal oxide, water to be used in the oxygen absorption reaction is used in the reaction which changes the alkaline earth metal oxide into a hydroxide. As a result, it becomes difficult for the oxygen absorption reaction to take place. Moreover, due to the alkaline property of the alkaline earth metal hydroxide formed, the reaction becomes inactive and the oxygen absorber composition no longer serves as an oxygen absorber. In the present invention, the oxygen absorber composition and the alkaline earth metal oxide are separated from each other when dispersed in the resin. Therefore, even if the alkaline earth metal oxide becomes an alkaline earth metal hydroxide, ions hardly pass through the resin. Accordingly, the oxygen absorber composition itself does not become alkaline, and suffers almost no hindrance of the oxygen absorption reaction.

Furthermore, this alkaline earth metal oxide restrains the oxygen absorber composition from absorbing water while the multi-layer structural body is stored, that is, after the multi-layer structural body is molded in a final usage form and until it is actually used. Therefore, the oxygen absorber composition never exhibits its oxygen absorbing performance during the above-described storage period. Surprisingly, however, this invention prevents the oxygen absorber composition from absorbing water when the oxygen absorber composition is stored, and what is more, it never hinders the oxygen absorption reaction, which requires moisture, when the substance to be preserved is actually preserved. This is because the amount of moisture permeating into the multi-layer structural body is different when the multi-layer structural body is stored and when it is actually used.

Materials of the multi-layer structural body of the present invention, even when they are molded by an extrusion method, exhibit a moisture removal function in a cylinder of an extrusion molding machine. Accordingly, even if a little moisture or crystal water exists in the thermoplastic resin or in the oxygen absorber composition, the extrusion molding can be conducted without any trouble such as bubbling. Therefore, it is possible to enhance the preservability of the multi-layer structural body at the level of raw materials, that is, before it is actually used.

Examples of the alkaline earth metal oxide to be mixed in the second layer are magnesium oxide, calcium oxide, strontium oxide, and barium oxide. Among these oxides, magnesium oxide and calcium oxide are specifically preferable because of easy availability and good reactivity. It is also desirable to use these oxides in a grain form. The oxides with 2–200 $\mu$m of average grain diameter are preferable, and those with 5–50 $\mu$m of average grain diameter are especially preferable. Moreover, in order to make the film thickness of the second layer of the present invention thin, it is preferable to use an alkaline earth metal oxide with an average grain diameter equal to or smaller than that of the metal iron. On the other hand, if the grain diameter is too small, there is a possibility that its hygroscopic property may be too strong, degrading the preservability and ease in handling, and that the alkaline earth metal oxides may be attached to the metallic iron even in the thermoplastic resin.

The second layer of the present invention can be obtained by mixing, kneading, and dispersing the oxygen absorber composition, which contains the aforementioned metal iron and metal halide, and the alkaline earth metal oxide in the above-described thermoplastic resin. A preferable content of the metal iron in the second layer is 2–93 wt %. If the percentage content of the metal iron is low, sufficient oxygen absorbing capability cannot be obtained. On the other hand, if the percentage content of the metal iron is high, there is a tendency to lower the mechanical strength and formability of the second layer. Therefore, it is specifically preferable to utilize the metal iron in a proportion of 10–70 wt % in the second layer.

Moreover, it is preferable that the second layer contains the alkaline earth metal oxide in a proportion of 0.1–5 wt % (against the entire layer). If the percentage content of the alkaline earth metal oxide is too low, a sufficiently improved effect of preservability cannot be obtained. On the other hand, if the percentage content of the alkaline earth metal oxide is too high, there is a tendency to give an adverse effect to the oxygen absorbing performance when the multi-layer structural body is used.

In order to mix the oxygen absorber composition and the alkali earth metal oxide in the thermoplastic resin, mixing or kneading can be performed by using an agitating-vane-type mixer, biaxial extrusion machine, etc. However, other methods may be chosen for the above purpose. It is also possible to select a master batch method of previously dispersing the oxygen absorber composition and the alkaline earth metal oxide in the thermoplastic resin at high concentration and then kneading and extruding them, if necessary, with additional thermoplastic resin, by using a single axial extrusion machine or other similar machines.

In the second layer, it is preferable that the oxygen absorber composition and the alkaline earth metal oxide are isolated from each other by the thermoplastic resin. A preferable condition can be obtained relatively easily if the second layer is extruded by using an extrusion machine which provides sufficient dispersibility. However, attention should be paid to the mixing method when the percentage content of the oxygen absorber composition is high, and when a previously prepared mixture of the oxygen absorber composition and the alkaline earth metal oxide is kneaded with the thermoplastic resin.

As for the third layer which becomes an inside wall when a package is formed out of the multi-layer structural body of the present invention, the third layer should isolate the preserved substance to be placed in the package from the second layer and should have high air permeability. For this purpose, it is desirable that materials of the third layer are adhesive enough to be extruded together with materials of the second layer, and that the third layer is a thin single layer.

In order to meet the above-described conditions, the resin forming the second layer should preferably contain either polyethylene or polypropylene in a proportion of 50% or more, and more preferably in a proportion of 60% or more. On the other hand, it is desirable that, when the resin forming the third layer is extruded together with the resin forming the second layer, the resin forming the third layer is a mixture of polyolefins (polyethylene, polypropylene, ethylene-propylene-copolymer, or a mixture thereof) which can be adhered to the resin forming the second layer, and poly-4-methyl-pentene-1 or resin which contains poly-4-methylpentene-1 as a main component.

Poly-4-methyl-pentene-1 is a kind of polyolefin which is superior in gas permeability such as oxygen and vapor. This is advantageous to the enhancement of the air permeability of the third layer, while there is the disadvantage that it has poor adhesiveness with other resins. However, in the present invention, poly-4-methyl-pentene-1 is mixed with polyolefins such as polyethylene and polypropylene in certain proportion and, therefore, remarkably strong adhesion to other resins can be obtained. When the percentage content of poly-4-methyl-pentene-1 is 10–80 wt %, the miscibility of poly-4-methyl-pentene-1 with polyolefin is poor. Therefore, the matrix obtained is lustrous like a pearl and has a high-grade appearance. At the same time, efficient enhancement of the oxygen permeability can be observed, which seems to be attributable to a morphological structure of the matrix, which structure consists of dispersed phases and continuous phases. When the percentage content of poly-4-methyl-pentene-1 is 50 wt % or less, its adhesion to the second layer containing polyethylene or polypropylene as a main component can be secured.

In the present invention, the third layer is composed of a mixture of two or more kinds of polyolefin, which mixture contains poly-4-methyl-pentene-1 or resin containing poly-4-methyl-pentene-1 as its main component in the proportion of 50 wt % or less. Thus the adhesion of the third layer to the second layer is secured, thereby enhancing the air permeability remarkably and realizing a third layer with a good appearance in a single layer construction. It is more preferable to compose the third layer of a mixture of two or more kinds of polyolefin, which mixture contains poly-4-methyl-pentene-1 or resin containing poly-4-methyl-pentene-1 as its main component in a proportion of 10–40 wt %. The thinner the film thickness of the third layer is, the more the air permeability of the third layer increases. However, as the third layer becomes thinner, its molding processibility and covering power are reduced, and the isolated condition of the second layer from the preserved substance becomes worse. Therefore, it is desirable to make the third layer 10–100 μm thick. It is possible to add dyestuffs or pigments to the third layer in order to cover or color the third layer, or to add various kinds of additives to the third layer in order to enhance its heat sealing property, etc.

There are two ways of preparing a package of the multi-layer structural body of the present invention. One way is to first form the multi-layer structural body of the present invention and then mold it into a package. The other way is to directly form a package from the multi-layer structural body. In either way, known methods can be applied to the formation of the package, and various conventional means used in resin processing and container processing can be applied.

For example, the package can be formed directly by utilizing known resin molding technology and processing, including extrusion molding with a T die or circular die, injection molding, direct blow molding, and orientation blow molding. It is also possible to form the package by using sheets, tubes, and parison obtained in the above-described methods and by performing vacuum forming, pressure forming, plug assist forming, bulge forming, or blow forming to form the package. Moreover, it is possible to form the main portion first, and then to combine it with other molded articles, or to perform various kinds of lamination such as heat lamination, dry lamination, extrusion lamination, or hot melt lamination, or to perform laminated processing such as coating. Furthermore, shrink packaging, shrink label packaging, or outside or inside packaging by using a case or bag can be applied. Examples of the package which can be formed in the above-described methods are a tray, cup, tube, bottle, case, or bag. It is also possible to use a sheet of the multi-layer structural body of the present invention as a top film to cover a gas-permeation-resistant container such as a tray or cup. As for the usage form of the multi-layer structural body, it is eventually necessary to seal the package hermetically in order to prevent oxygen from permeating into the package from outside. As a method of hermetical sealing, a closure means, top film, outside package or other conventional technology can be applied.

DETAILED DESCRIPTION OF THE PREFERRED EMBODIMENTS

Embodiments of the present invention are hereinafter explained with reference to the drawings.

EXAMPLE 1

Iron powder (median diameter on a weight basis: 35 μm) was put in a vacuum mixing dryer with a heat jacket, and was heated and dried at a temperature of 130° C. under 10 mmHg of reduced pressure. At the same time, a mixed aqueous solution of calcium chloride, sodium chloride, and water, which was mixed in the proportion of calcium chloride:sodium chloride :water=0.5:0.5:2.5 (parts by weight), was sprayed to 100 parts by weight of the iron powder. Accordingly, the mixed solution was attached to the surface of the iron powder, thereby obtaining an oxygen absorber composition.

Then polypropylene and the oxygen absorber composition were mixed and kneaded in a weight ratio of polypropylene oxygen absorber composition=2:3 by using a biaxial extrusion machine (45 mmφ) which rotates in a unilateral direction. The kneaded mixture was cooled by using a net belt with a blower and was made to go through a pelletizer, thereby obtaining oxygen absorber composition pellets.

Figure 1:
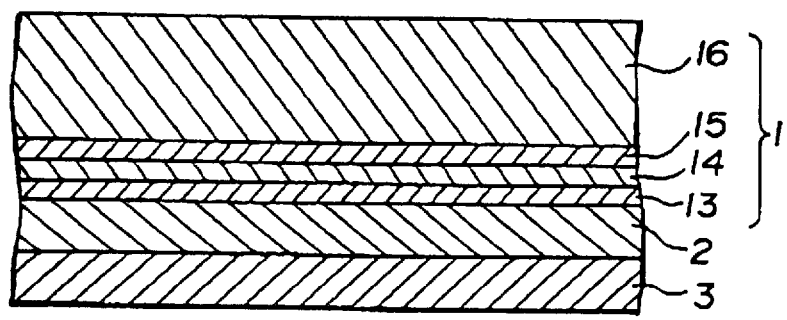
FIG. 1 is a sectional view of the multi-layer structural body of the present invention.

Subsequently, a multi-layered sheet molding device was used, which consist of first through fourth extrusion machines, feed blocks, T dies, cooling rolls, and sheet take-off machines, and which forms a six-layer construction from four groups of materials. The first extrusion machine was provided with polypropylene with white pigments added. The second extrusion machine was provided with the oxygen absorber composition pellets. The third extrusion machine was provided with ethylene-vinyl-alcohol-copolymer. The fourth extrusion machine was provided with maleic anhydride modified polypropylene. These materials were extruded from the respective extrusion machines, thereby obtaining the multi-layer structural body as shown in FIG. 1. This multi-layer structural body comprises: a third layer 3 of polypropylene with white pigments added; a second layer 2 of the oxygen absorber composition pellets, which is laminated over the third layer 3; and a first layer 1. The first layer consists of: layer 13 of maleic anhydride modified polypropylene, which is laminated over the second layer 2; layer 14 of ethylene-vinyl-alcohol-copolymer, which is laminated over layer 13; layer 15 of maleic anhydride modified polypropylene, which is laminated over layer 14; and layer 16 of polypropylene with white pigments added, which is laminated over layer 15. In the present invention, film thickness of the respective layers is set as follows: the third layer at 100 μm; the second layer at 100 μm; layer 13 at 15 μm; layer 14 at 20 μm; layer 15 at 15 μm; and layer 16 at 250 μm.

Figure 2:
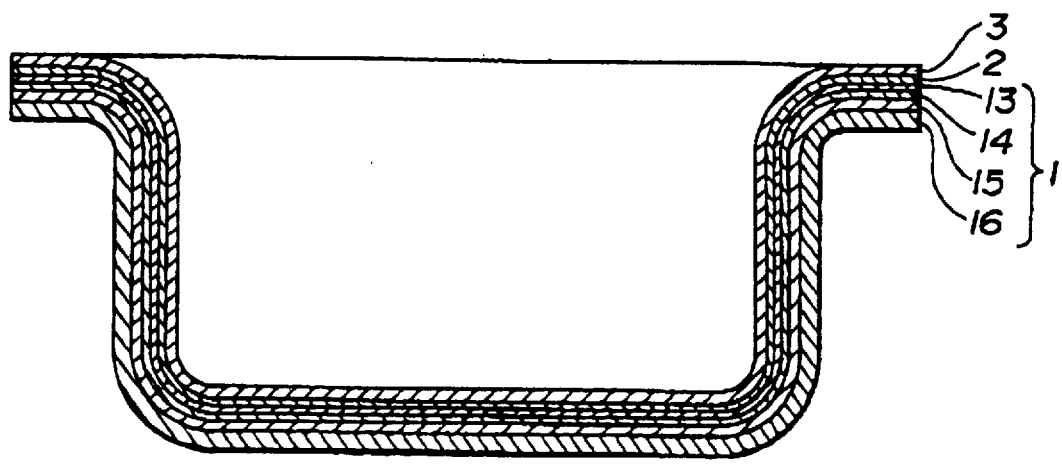
FIG. 2 is a sectional view of a container made of the multi-layer structural body of this invention.

Then, the multi-layer structural body was molded into a tray-shaped container (length 150 mm×width 100 mm×depth 30 mm, and about 350 cc of content volume) with the third layer 3 being the innermost layer, as shown in FIG. 2, by a plug assist forming method by using a vacuum forming machine at a temperature of about 180° C.

Figure 3:
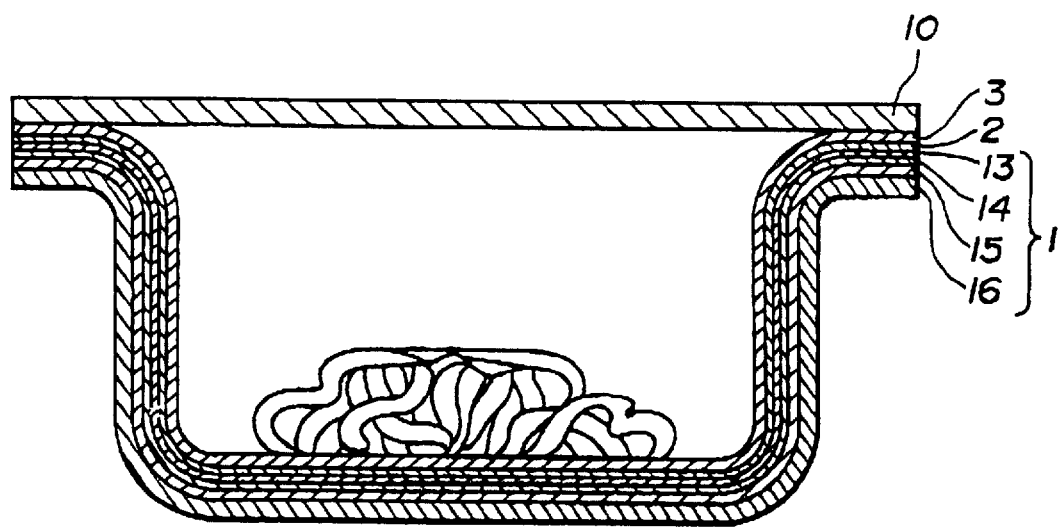
FIG. 3 is a sectional view of the container of this invention in which a preserved substance is placed and which is hermetically sealed.

Boiled pasta (200 g) was placed in the tray-shaped container obtained in this Example 1, and then nitrogen replacement was conducted by using a cup sealer with a nitrogen blow device so that the oxygen content within the tray-shaped container became about 5%. A top film 10 was then hermetically sealed to the tray-shaped container by heat, as shown in FIG. 3, in order to hermetically seal the tray-shaped container with the above-mentioned oxygen content. Although not shown in FIG. 3, this top film 10 is in a five-layer structure which consists of: a layer of polypropylene which is 50 μm in film thickness; a layer of maleic anhydride modified polypropylene which is 5 μm in film thickness and which is laminated over the above first layer; a layer of ethylene-vinyl-alcohol-copolymer which is 10 μm in film thickness and which is laminated over the above second layer; a layer of maleic anhydride modified polypropylene which is 5 μm in film thickness and which is laminated over the above third layer; and a layer of nylon which is 20 μm in film thickness and which is laminated over the above fourth layer.

Subsequently, the tray-shaped container, in which the boiled pasta was placed and which was hermetically sealed, was preserved at room temperatures. The preserved condition of the pasta was examined and the oxygen content within the tray-shaped container was measured by gas chromatography along the passage of time. After 30-day preservation of the tray-shaped container, small pores were opened in the top film 10 and the container was heated in a microwave oven (made by Mitsubishi Electric Corp., 500W) for five minutes, and resistance to microwaves was examined. The results of these tests are shown in Table 1.

Then, a sheet corresponding to the first layer 1 and a sheet corresponding to the third layer 3 were separately prepared in the manufacturing method described above. Both sheets were respectively molded into tray-shaped containers in the same manner as described above. Oxygen permeability of the two tray-shaped containers obtained was measured under the condition of 23° C. and 100% RH.

As a result, the oxygen permeability of the sheet corresponding to the first layer 1 was 10 cc/m$^2$·day·atm or less, and the oxygen permeability of the sheet corresponding to the third layer 3 was 900 cc/m$^2$·day·atm or more.

COMPARATIVE EXAMPLE 1

As COMPARATIVE EXAMPLE 1, 100 parts by weight of iron powder (median diameter on a weight basis: 35 μm) and 1 part by weight of a mixture of calcium chloride and sodium chloride (mixed in the proportion of calcium chloride:sodium chloride =1:1) were mixed by using a Henschel mixer, thereby obtaining an oxygen absorber composition.

The oxygen absorber composition pellets were manufactured and were formed into a sheet and then into a tray-shaped container by using the oxygen absorber composition manufactured in COMPARATIVE EXAMPLE 1 above instead of the oxygen absorber composition obtained in EXAMPLE 1, in the same manner as in Example 1, thereby obtaining a tray-shaped container (comparative container 1).

Boiled pasta was placed in the tray-shaped container (comparative container 1) and the tray-shaped container was then hermetically sealed in the same manner as in EXAMPLE 1. The preservability test and the microwave resistance test were conducted in the same manner as in EXAMPLE 1. The results of the tests are shown in Table 1.

COMPARATIVE EXAMPLE 2

As COMPARATIVE EXAMPLE 2, the same sheet as the multi-layer structural body obtained in EXAMPLE 1 was prepared, except that the second layer 2 of EXAMPLE 1 was not included. The sheet obtained was formed into a sheet and then into a tray-shaped container in the same manner as in EXAMPLE 1, thereby obtaining a tray-shaped container (comparative container 2).

Boiled pasta was placed in the tray-shaped container (comparative container 2) and the tray-shaped container was then hermetically sealed in the same manner as in EXAMPLE 1. The preservability test and the microwave resistance test were conducted in the same manner as in EXAMPLE 1. The results of the tests are shown in Table 1.

COMPARATIVE EXAMPLE 3

As COMPARATIVE EXAMPLE 3, the comparative container 2 was used, in which were placed the same type of boiled pasta as used in EXAMPLE 1 and a small bag containing an oxygen absorber composition ("AGELESS FX" made by Mitsubishi Gas Chemical Co., Inc.), and which was hermetically sealed in the same manner as in EXAMPLE 1. The preservability test and the microwave resistance test were conducted in the same manner as in EXAMPLE 1. The results of the tests are shown in Table 1.

TABLE 1

| | EX*[1]. 1 | CE*[2]. 1 | CE. 2 | CE. 3 |
|---|---|---|---|---|
| Oxygen Content at the Beginning | 5.3% | 5.0% | 4.9% | 5.1% |
| Oxygen Content after 7 Days | 0.1% or less | 4.4% | 5.0% | 0.1% or less |
| Oxygen Content after 30 Days | 0.1% or less | 0.1% or less | 0.1% or less | 0.1% or less |
| Properties of Pasta after 30 Days | Good flavor maintained | Fungi generated and deteriorating smell | Fungi generated and deteriorating smell | Good flavor maintained |
| Results of Microwave Resistance Test after 30 Days | No changes | — | — | Oxygen absorber composition burnt and contents of the bag ran off |

Note:
*[1]EX: EXAMPLE
*[2]CE: COMPARATIVE EXAMPLE

Table 1 shows that the oxygen content within the tray-shaped containers of EXAMPLE 1 and COMPARATIVE EXAMPLES 1–3 were substantially the same at the beginning, but seven days later, the oxygen content within the containers of EXAMPLE 1 and COMPARATIVE EXAMPLE 3 decreased to 0.1% or less. This is because the oxygen absorber composition which is a component element of the tray-shaped container of EXAMPLE 1 is capable of efficiently absorbing oxygen within the tray-shaped container. Moreover, Table 1 shows that no fungus was generated and the good flavor of the boiled pasta was maintained in EXAMPLE 1 and COMPARATIVE EXAMPLE 3 even after the 30-day preservation period. It is also confirmed that the container of EXAMPLE 1 has the same oxygen absorbing performance as that of COMPARATIVE EXAMPLE 3 in which the small bag containing the oxygen absorber composition was placed. It is further confirmed that the container of EXAMPLE 1 is superior in its resistance to microwaves.

On the other hand, almost no changes are observed in the oxygen content within the containers of COMPARATIVE EXAMPLES 1 and 2 after seven days. Moreover, after thirty days, it is confirmed that fungi and deteriorating smell were generated in COMPARATIVE EXAMPLES 1 and 2. The oxygen content within the containers of COMPARATIVE EXAMPLES 1 and 2 decreased to 0.1% or less after thirty days because oxygen was consumed by the fungi generated.

As a result, it has been proved that the tray-shaped container made of the multi-layer structural body of the present invention is superior in oxygen absorbing performance and is capable of impeding permeation of oxygen from outside of the container. Moreover, the multi-layer structural body of the present invention is capable of performing practical oxygen absorption without any high temperature treatment such as heat sterilization or retort treatment, and can be applied to various kinds of food or medicines, etc. Further, it is superior in resistance to microwaves and, therefore, can be used in a microwave oven.

EXAMPLE 2

EXAMPLE 2 of the present invention is hereinafter explained with reference to the drawings.

100 parts by weight of iron powder (median diameter on a weight basis: 20 $\mu$m or shorter), 1 part by weight of calcium chloride, 2 parts by weight of yellow iron oxide, 0.5 parts by weight of powdered activated carbon, and 3 parts by weight of polypropylene (granulated to be 10 $\mu$m or shorter in a median diameter on a weight basis) were mixed by using a Henschel mixer. The mixture obtained was formed into tablets (diameter: 9 mm) by using a rotary tablet machine. These tablets were ground by a speed mill and then were screened, thereby obtaining an oxygen absorber composition which was made in a dust size of 100–250 mesh.

Subsequently, polypropylene and the above-mentioned oxygen absorber composition were mixed and kneaded in the weight ratio of polypropylene:free oxygen absorber composition=1:1 by using a biaxial extrusion machine (45 mm$\phi$) which rotates in a unilateral direction. The kneaded mixture was extruded from a strand die, and the extruded mixture was cooled by using a net belt with a blower and was made to go through a pelletizer, thereby obtaining pellets containing the oxygen absorber composition.

Figure 4:
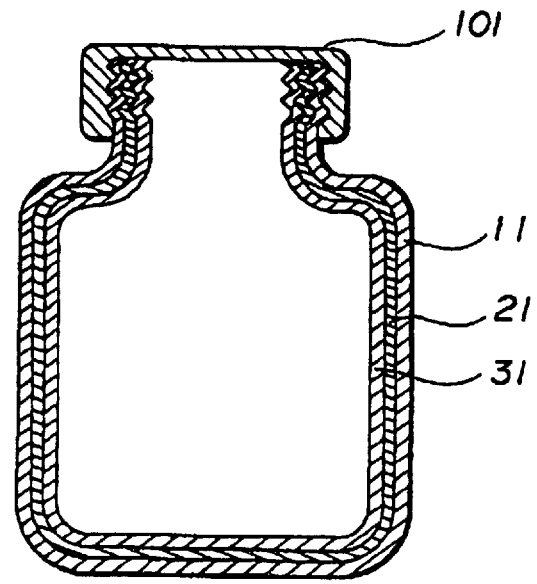
FIG. 4 is a sectional view of a wide-mouthed bottle made of the multi-layer structural body of this invention.

By using a blow molding device which consists of first and second extrusion machines, multi-layer circular dies, and mold dies for blow molding, a wide-mouthed bottle (mouth diameter: 40 mm; diameter of the body portion: 60 mm; height: 95 mm; and volume: about 180 ml) was formed. As shown in FIG. 4, the wide-mouthed bottle is constructed by laminating layers in the following order from the innermost layer to the outermost layer: a third layer of polyethylene (50 $\mu$m in film thickness); a second layer of polyethylene (200 $\mu$m in film thickness) in which the oxygen absorber composition is dispersed; and a first layer of polyethylene (450 $\mu$m in film thickness of the body portion).

Then 100 g of diced bacon was put in the wide-mouthed bottle, and the bottle was hermetically sealed with a metal lug cap with lining 101 and was preserved at room temperature. The oxygen content within the bottle was measured with the passage of time and the preservability of the bacon was examined. The measurements of changes in the oxygen content with the passage of time within the bottle was conducted by gas chromatography, and these measurements of changes during the passage of time and the preservability examination were conducted for preservation periods: 7 days, 30 days, and 190 days. The results obtained are shown in Table 2.

EXAMPLE 3

Figure 5:
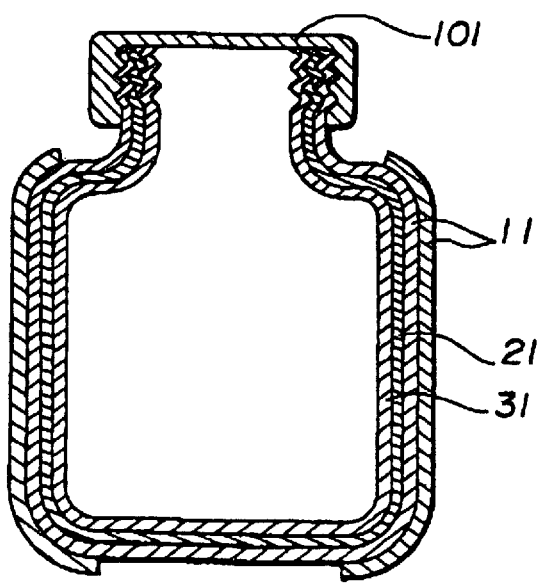
FIG. 5 is a sectional view of another wide-mouthed bottle made of the multi-layer structural body of this invention.

The body portion of the same wide-mouthed bottle as that obtained in EXAMPLE 2 was covered with a barrier shrink film ("BDF 2001" made by CRYOVAC) which was in a cylindrical shape (diameter: 65 mm; height 80 mm) and in the laminated structure of polyolefin and ethylene-vinyl-acetate-copolymer. This barrier shrink film was made to shrink with hot air and thereby made to closely contact the body portion of the bottle, thereby obtaining the wide-mouthed bottle shown in FIG. 5. Namely, the first layer of EXAMPLE 3 consists of polyethylene (450 $\mu$m in film thickness) and the barrier shrink film.

Diced bacon was placed in the wide-mouthed bottle covered with the barrier shrink film, and the bottle was hermetically sealed in the same manner as EXAMPLE 2. Then the same examinations were conducted as in EXAMPLE 2. The results obtained are shown in Table 2.

COMPARATIVE EXAMPLE 4

A wide-mouthed bottle (thickness of the body portion: 700 $\mu$m) made of only polyethylene of the same type as that of EXAMPLE 2 was formed by using one extrusion machine of the same blow molding device as that of EXAMPLE 2. Diced bacon was put in the wide-mouthed bottle, and the bottle was hermetically sealed in the same manner as in EXAMPLE 2. Then the same examinations were conducted as in EXAMPLE 2. The results obtained are shown in Table 2.

COMPARATIVE EXAMPLE 5

100 parts by weight of iron powder (median diameter on a weight basis: 20 $\mu$m or shorter), 1 part by weight of calcium chloride, 2 parts by weight of yellow iron oxide, 0.5 parts by weight of powder activated carbon, and 3 parts by weight of polypropylene (granulated to be 10 $\mu$m or shorter in a median diameter on a weight basis) were mixed by using a Henschel mixer, thereby obtaining an oxygen absorber composition.

A wide-mouthed bottle was then formed in the same manner as in EXAMPLE 2, except that the above oxygen absorber composition prepared in COMPARATIVE EXAMPLE 5 was used instead of the oxygen absorber composition used in EXAMPLE 2. The wide-mouthed bottle with diced bacon placed inside was hermetically sealed in the same manner as in EXAMPLE 2, and the same examinations were conducted as in EXAMPLE 2. The results obtained are shown in Table 2.

For the wide-mouthed bottles formed in EXAMPLES 2 and 3, the oxygen permeability of the second layers (the layer of polyethylene (450 $\mu$m in film thickness) in EXAMPLE 2, and the layer of polyethylene (450 $\mu$m in film thickness) and the barrier shrink film in EXAMPLE 3) and the third layers (the layers of polyethylene (respectively 50 $\mu$m in film thickness) in both EXAMPLES 2 and 3) were measured. As for the layers of polyethylene, the same materials as used in these examples and a sheet molding device with a T die were used. The layers of polyethylene were separately formed into a sheet form of the same thickness as described above, and the oxygen permeability of the sheets were measured. As for the barrier shrink film, its oxygen permeability was measured in its state before it was shrunk by heat. The results obtained are shown in Table 2.

TABLE 2

|  | EX. 2 | EX. 3 | CE. 4 | CE. 5 |
|---|---|---|---|---|
| Oxygen Permeability of the 1st and 3rd layers (cc/m$^2$·day·atm) 23° C., 100% RH | 1st Layer: 300 3rd Layer: 3200 | 1st Layer: 20 or less 3rd Layer: 3200 | | |
| Oxygen Content after 7 days | 0.1% or less | 0.1% or less | 18.9% | 15.7% |
| Oxygen Content and Properties of Bacon after 30 Days | 0.1% or less Good | 0.1% or less Good | 17.9% Discoloration and oxidized smell | 8.3% Discoloration |
| Oxygen Content and Properties of Bacon after 190 Days | 0.7% Almost good | 0.1% or less Good | Deterioration | Deterioration |

According to Table 2, since the outside wall of the wide-mouthed bottle of EXAMPLE 3 was covered with the barrier shrink film, the oxygen permeability of the first layer was 20 cc/m$^2$·day·atm or less, which is very low.

Table 2 also shows that in EXAMPLES 2 and 3, the oxygen content of the wide-mouthed bottles decreased to 0.1% or less after the 7-day preservation period. This is because the oxygen absorber composition, which was a component element of the wide-mouthed bottles, was capable of efficiently absorbing oxygen within the wide-mouthed bottles. It is also confirmed that even after the 30-day preservation period in EXAMPLES 2 and 3, the oxygen content within the wide-mouthed bottles was maintained to be 0.1% or less and the properties of the bacon were still in good condition. As for EXAMPLE 3, the oxygen content within the bottle and the properties of the bacon were maintained even after the 190-day preservation period.

On the other hand, in COMPARATIVE EXAMPLES 4 and 5, the oxygen content within the bottles did not decrease after the 7-day preservation period. After the 30-day preservation period, some changes were recognized in the properties of the bacon. After the 190-day preservation period, deterioration of the bacon was confirmed both in COMPARATIVE EXAMPLES 4 and 5.

EXAMPLE 4

An oxygen absorber composition manufactured in the same manner as in EXAMPLE 1 and ethylene-propylene-random-copolymer (Vicat softening temperature: 119° C.) were mixed and kneaded in the weight ratio of the oxygen absorber composition: ethylene-propylene-random-copolymer=3:2, thereby obtaining oxygen absorber composition pellets.

A multi-layer structural body of the same film thickness as that used in EXAMPLE 1 was formed in the same manner as in EXAMPLE 1, except that the oxygen absorber composition pellets manufactured in EXAMPLE 4 above were used instead of the oxygen absorber composition used in EXAMPLE 1, and that ethylene-propylene-block-copolymer (Vicat softening temperature: 144° C.) was used instead of polypropylene with white pigments added.

Then, a tray-shaped container (length 150 mm×width 100 mm×depth 30 mm, and content volume; about 350 cc) was molded, with the third layer being the innermost layer of the container, respectively out of the above-described multi-layer structural body and the multi-layer structural body obtained in EXAMPLE 1 by using two kinds of molding machines and by changing heat temperatures as shown in Table 3. The conditions of the forms were then examined. The results obtained are shown in Table 3.

TABLE 3

| Forming Method | | Formed Condition | |
|---|---|---|---|
| Forming Machine | Forming Temperature | EX. 1 | EX. 4 |
| Pressure vacuum forming machine 1 | 165° C. | Inside surface of the container became slightly uneven | Good |
| Hot plate contact heating method | 180° C. | Good | Good |
| Pressure vacuum forming machine 2 | 170° C. | Good | Good |
| Extreme infrared radiation heating method | 190° C. | Good | Good |

Table 3 shows that the inside surface of the tray-shaped container of EXAMPLE 4 did not become uneven at a low heating temperature, that is, 160° C. at the time of molding, and that good formability was obtained. This is the effect of the softening temperature of the resin forming the second layer set lower than that of the resin forming the third layer of the multi-layer structural body which composes the tray-shaped container of EXAMPLE 4.

EXAMPLE 5

EXAMPLE 5 of the present invention is hereinafter explained.

100 Kg of reduced iron powder (median diameter on a weight basis: 30 μm) was put in a vacuum mixing dryer with a heat jacket. While the reduced iron powder was heated and dried at a temperature of 140° C. and under reduced pressure of 10 mm Hg, 7 Kg of 20 wt % calcium chloride aqueous solution was sprayed on the reduced iron. The reduced iron powder with the calcium chloride solution sprayed thereon was dried and screened, and grains larger than 300 mesh were removed, thereby obtaining an oxygen absorber composition.

By using a unilateral rotary biaxial extrusion machine (45 mmφ) with vents and a quantitative feeder, ethylene-propylene-copolymer and the above oxygen absorber composition were mixed and kneaded in the proportion of ethylene-propylene-copolymer: oxygen absorber composition=2:3. The kneaded mixture was extruded from a strand die, and the extruded mixture was air-cooled and crushed, thereby obtaining a master batch A.

Then by using the above-mentioned extrusion machine, calcium oxide (median diameter on a weight basis: 20 μm) and ethylene-α-olefine-copolymer were mixed and kneaded in a weight ratio of 1:1, and a master batch B was obtained by the same operations as described above.

Subsequently, a multi-layer structural body having the structure shown in Table 4 was prepared by using a sheet extrusion device which consists of the first through fifth extrusion machines, feed blocks, T dies, cooling rolls, sheet take-off machines, slitters, and winders, and which forms a six-layer construction from five groups of materials.

TABLE 4

| Extrusion Machine | Extruded Compositions | Corresponding Layers |
|---|---|---|
| 1st Extrusion Machine | Ethylene-propylene-copolymer: 90 wt % Titanium oxide pigment: 10 wt % | Isolating layer |
| 2nd Extrusion Machine | Master batch A: 98 wt % Master batch B: 2 wt % | Oxygen absorber layer |
| 3rd Extrusion Machine | Nylon MXD6 | Gas-permeation-resistant layer |
| 4th Extrusion Machine | Maleic anhydride modified polypropylene | Adhesive layer |
| 5th Extrusion Machine | Ethylene-propylene-copolymer: 95 wt % Titanium oxide pigment: 5 wt % | Strength-retaining layer |

The multi-layer structural body in the construction shown in Table 4 consists of: a first layer which consists of three kinds of layers, that is, a layer of nylon MXD6 (20 µm in film thickness), a layer of maleic anhydride modified polypropylene (15 µm in film thickness), and a layer of a mixture of ethylene-propylene-copolymer and titanium oxide pigments (250 µm in film thickness); a second layer (140 µm in film thickness) which consists of a mixture of ethylene-propylene-copolymer, master batch A, and master batch B; and a third layer of ethylene-propylene-copolymer (60 µm in film thickness). The layer of nylon MXD6 gives resistance to gas permeation, the layer of maleic anhydride modified polypropylene gives adhesiveness, and the layer of the mixture of ethylene-propylene-copolymer and titanium oxide pigments gives retaining strength.

COMPARATIVE EXAMPLE 6

A multi-layer structural body of the same construction as that used in EXAMPLE 5 was prepared in the same manner as in EXAMPLE 5, except that the composition of the master batch B was not used among the compositions extruded from the second extrusion machine used in EXAMPLE 5, and that the content of ethylene-propylene-copolymer was changed to 12 wt %. As a result of observation of this multi-layer structural body, the surface of the third layer became uneven and was no longer flat. Moreover, bubbles were generated in the second layer.

COMPARATIVE EXAMPLE 7

A multi-layer structural body of the same construction as that used in EXAMPLE 5 was prepared in the same manner as in COMPARATIVE EXAMPLE 6, except that immediately before the preparation of the master batch B, the oxygen absorber composition was dried for one hour at a temperature of 300° C. under a nitrogen gas atmosphere by using an electric furnace. According to observations of this multi-layer structural body, the surfaces of the multi-layer structural body were deemed flat and smooth and in good condition as in EXAMPLE 5.

EXAMPLE 6

The multi-layer structural body (50 m long) obtained in EXAMPLE 5 was wound around a vinyl chloride pipe (3 inches in inside diameter), and then was wrapped with a moisture-proof film made of aluminum-foil-laminated polypropylene. The wrapped multi-layer structural body was sealed with tape. The wrapped multi-layer structural body was put in a bag made of laminated films of nylon coated with vinylidene chloride and of polyethylene. The mouth of the bag was hermetically sealed by heat, and the bag was preserved indoors.

This multi-layer structural body was opened after 2-month preservation, and a formed tray (content volume: 270 cc) was formed in a vacuum forming method at a temperature of 185° C. by using a vacuum forming machine (capable of forming 15 trays, each 130 mm×90 mm×depth 25 mm). According to observations, the formed condition of the formed tray was deemed good.

COMPARATIVE EXAMPLE 8

The multi-layer structural body obtained in COMPARATIVE EXAMPLE 7 was preserved in the same wrapped form as in EXAMPLE 6. The wrapped multi-layer structural body was opened after a 2-month preservation, and was then formed into a formed tray in a vacuum forming method under the same conditions as in EXAMPLE 6. According to observations of the formed condition of the tray, bubbles were generated in the tray, which destroyed the appearances of the tray, the third layer was partly broken and the second layer was exposed. Therefore, the formed tray was not usable as a tray.

EXAMPLE 7

The formed tray obtained in EXAMPLE 6 with 250 cc of boiling water poured inside was covered with a top film of laminated layers of polyester, aluminum foil, and polypropylene, and was hermetically sealed by heat. This sealed tray was placed and left at room temperature, and the oxygen content within the tray was analyzed by gas chromatography after a 24-hour preservation and a 2-month preservation. The results obtained are shown in Table 5.

EXAMPLE 8

The formed tray obtained in EXAMPLE 6 was put in a bag of nylon-laminated polyethylene, and the mouth of the bag was tied with a rubber band. The formed tray was then left indoors, and after a 2-month preservation, the oxygen content was measured in the same manner as in EXAMPLE 7. The results obtained are shown in Table 5.

COMPARATIVE EXAMPLE 9

For the formed tray obtained in COMPARATIVE EXAMPLE 7, the oxygen content within the tray was analyzed by gas chromatography under the same conditions as in EXAMPLE 7. The results obtained are shown in Table 5.

COMPARATIVE EXAMPLE 10

The oxygen content within the tray was analyzed by gas chromatography under the same conditions as in EXAMPLE 8, except that the formed tray obtained in COMPARATIVE EXAMPLE 7 was used instead of the formed tray obtained in EXAMPLE 6. The results obtained are shown in Table 5.

TABLE 5

| | | Oxygen Content after 24 Hours | Oxygen Content after 2 Months |
|---|---|---|---|
| Before Preservation | EX. 7 | 2.2% | 0.1% or less |
| | CE. 9 | 2.4% | 0.1% or less |

TABLE 5-continued

|  |  | Oxygen Content after 24 Hours | Oxygen Content after 2 Months |
|---|---|---|---|
| After Preservation | EX. 8 | 2.3% | 0.1% or less |
|  | CE. 10 | 4.7% | 0.1% or less |

EXAMPLE 9

By using a multi-layered sheet molding device which consists of the first through fifth extrusion machines, feed blocks, T dies, cooling rolls, and sheet take-off machines, and which forms a six-layer construction from five groups of materials, a multi-layer structural body sheet was obtained by simultaneously extruding a third layer from the first extrusion machine, a second layer from the second extrusion machine, and a first layer from the third through fifth extrusion machines. Table 6 shows the materials extruded from the respective machines. Table 7 shows the film thickness of the respective layers of the multi-layer structural body sheet.

After the multi-layer structural body sheet was formed into a tray-shaped container in the same manner as in EXAMPLE 1, 300 cc of boiling water was poured into it. The tray-shaped container was hermetically sealed with a top film made of PET (polyethylene terephthalate) (film thickness: 16 μm), aluminum (film thickness: 40 μm), and PE (polyester) (film thickness: 28 μm), which were laminated in the above-listed order, by using a cup sealer. The tray-shaped container was preserved at room temperature, and the oxygen content within the tray-shaped container was analyzed with the passage of time by gas chromatography. The results obtained are shown in Table 8.

EXAMPLE 10

A multi-layer structural body sheet of the same film thickness as that of EXAMPLE 9 was obtained by using the same device as in EXAMPLE 9 and in the same manner as in EXAMPLE 9, except that the resin extruded from the first extrusion machine was changed as shown in Table 6. After the multi-layer structural body sheet was formed into a tray-shaped container and was filled with boiling water in the same manner as in EXAMPLE 9, the oxygen content within the tray-shaped container was analyzed in the same manner as in EXAMPLE 9. The results obtained are shown in Table 8.

COMPARATIVE EXAMPLE 11

A multi-layer structural body sheet of the same film thickness as that of EXAMPLE 9 was obtained by using the same device as in EXAMPLE 10 and in the same manner as in EXAMPLE 9, except that the resin extruded from the second extrusion machine was changed as shown in Table 6. After the multi-layer structural body sheet was formed into a tray-shaped container and was filled with boiling water in the same manner as in EXAMPLE 9, the oxygen content within the tray-shaped container was analyzed in the same manner as in EXAMPLE 9. The results obtained are shown in Table 8.

TABLE 6

|  | EXAMPLE 9 | EXAMPLE 10 | CE. 11 |
|---|---|---|---|
| 1st Extrusion Machine (Layer 3) | Mixture of (1) polypropylene with white pigments added, (2) poly-4-methyl-pentene resin (TPX made by Mitsui Petrochemical Industries, Ltd.), and (3) LLDPE (mixed in the proportion of 60:30:10 wt %) | Polypropylene with white pigments added | Polypropylene with white pigments added |
| 2nd Extrusion Machine (Layer 2) | Oxygen absorber composition pellets of EXAMPLE 1 | Oxygen absorber composition pellets of EXAMPLE 1 | Oxygen absorber composition pellets of COMPARATIVE EXAMPLE 1 |
| 3rd Extrusion Machine (Layers 13, 15) | Maleic anhydride modified polypropylene | Maleic anhydride modified polypropylene | Maleic anhydride modified polypropylene |
| 4th Extrusion Machine (Layer 14) | Ethylene-vinyl-alcohol-copolymer | Ethylene-vinyl-alcohol-copolymer | Ethylene-vinyl-alcohol-copolymer |
| 5th Extrusion Machine (Layer 16) | Polypropylene with white pigments added | Polypropylene with white pigments added | Polypropylene with white pigments added |

TABLE 7

|  |  | EX. 9 | EX. 10 | CE. 11 |
|---|---|---|---|---|
| Layer 3 |  | 50 μm | 50 μm | 50 μm |
| Layer 2 |  | 120 μm | 120 μm | 120 μm |
| Layer 1 | Layer 13 | 15 μm | 15 μm | 15 μm |
|  | Layer 14 | 20 μm | 20 μm | 20 μm |
|  | Layer 15 | 15 μm | 15 μm | 15 μm |
|  | Layer 16 | 300 μm | 300 μm | 300 μm |

TABLE 8

| Number of Days under Preservation | EX. 9 | EX. 10 | CE. 11 |
|---|---|---|---|
| 7 days | 0.1% or less | 2.3% | 5% or more |
| 14 days | 0.1% or less | 0.1% or less | 5% or more |

According to Table 8, it was confirmed that the tray-shaped container obtained in EXAMPLE 9 absorbed oxygen rapidly and the oxygen content within the container became 0.1% or less after the 7-day preservation period. In both EXAMPLES 9 and 10, the oxygen content within the containers after the 14-day preservation showed good results, 0.1% or less. On the other hand, it was confirmed that COMPARATIVE EXAMPLE 11 showed high oxygen content, that is, 5% or more, both after the 7-day and 14-day preservation periods.

Figure 6:
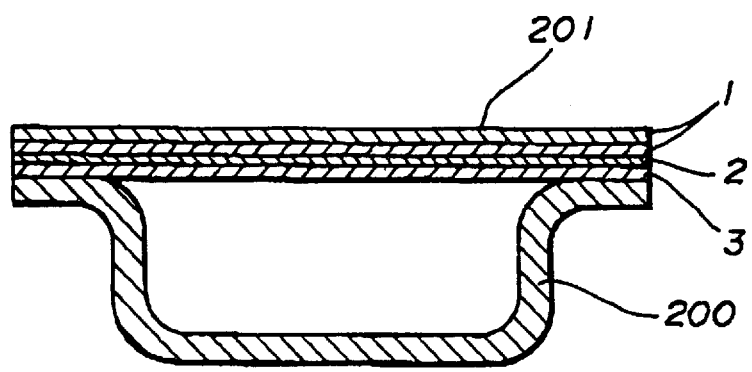
FIG. 6 is a sectional view of a container which is covered with a lid made of the multi-layer structural body of this invention.
Figure 7:
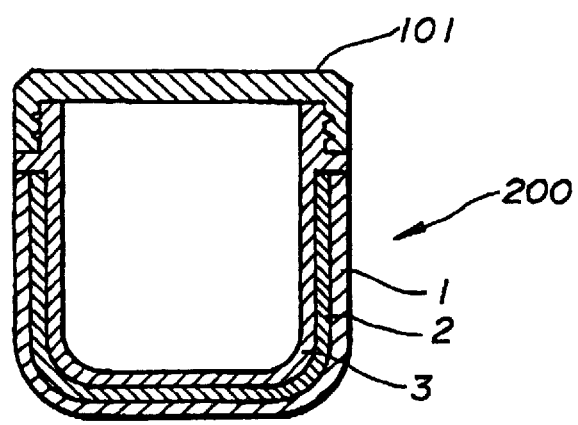
FIG. 7 is a sectional view of a still another wide-mouthed bottle made of the multi-layer structural body of this invention.

The multi-layer structural body of the present invention can be used, other than as a container such as a tray or bottle, as a lid 201 of a container 200 as shown in FIG. 6. Moreover, as shown in FIG. 7, only a part of the container 200 may be in a three-layer structure.

What is claimed is:

1. A multi-layer structural body comprising:
   a first layer resistant to gas permeation;
   a second layer laminated on said first layer and having a deoxidizing property; and a third layer which is gas permeable and laminated on said second layer, wherein said first layer has an oxygen permeability of less than 100 cc/m$^2$·day·atm (23° C., 100% RH), wherein said second layer comprises:
- a resin having an oxygen permeability coefficient of at least 200 cc·0.1 mm/m$^2$·day·atm (23° C., 100% RH);
- a granular oxygen absorber composition dispersed in said resin and including a deoxidation material undergoing a deoxidation reaction when exposed to moisture; and
- calcium oxide dispersed in said resin as a moisture absorber, wherein said third layer has an oxygen permeability of at least 100 cc/m$^2$·day·atm (23° C., 100% RH).

2. The multi-layer structural body according to claim 1, wherein said oxygen absorber composition has an initial moisture content of no more than 0.2 wt %.

3. The multi-layer structural body according to claim 1, wherein:
- said first layer includes at least one layer comprising at least one of the following group: ethylene-vinyl alcohol copolymer; polyolefins; polyester; polyamides; and other synthetic resins,
- said second layer includes a layer comprising polyolefins or other thermoplastic resins, and
- said third layer includes at least one layer comprising at least one of the following group: polyolefins; a graft polymer with silicone resin; polyester; polyamides; or other synthetic resins.

4. The multi-layer structural body according to claim 1, wherein said second layer consists of ethylene-propylene-random-copolymer, and said third layer mainly consists of polypropylene.

5. The multi-layer structural body according to claim 1, wherein a compounding ratio of the oxygen absorber composition in said second layer is 2–93 wt %.

6. The multi-layer structural body according to claim 1, wherein said second layer has a thickness not exceeding 1000 μm.

7. The multi-layer structural body according to claim 1, wherein the grains of said granular oxygen absorber have a median diameter in a range of 5–200 μm.

8. The multi-layer structural body according to claim 1, wherein said second layer softens in response to a temperature rise faster than said third layer softens.

9. The multi-layer structural body according to claim 8, wherein said second layer has a softening temperature no higher than softening temperatures of said first and third layers.

10. The multi-layer structural body according to claim 1, wherein said oxygen absorber composition contains metallic iron and a metal halide.

11. The multi-layer structural body according to claim 1, wherein said calcium oxide is dispersed in said resin as grains separate from grains of said granular oxygen absorber composition.

12. The multi-layer structural body according to claim 1, wherein a compounding ratio of said calcium oxide to said resin is 0.1–5 wt %.

13. The multi-layer structural body according to claim 1, wherein said first layer contains a coloring agent.

14. The multi-layer structural body according to claim 1, wherein said third layer is a mixture of a first resin adhered to said second layer, and a second resin which has poor miscibility with said first resin.

15. The multi-layer structural body according to claim 14, wherein both said resin of said second layer and said first and second resins of said third layer are polyolefins, said second resin has an oxygen permeability higher than that of said first resin, and said second resin does not hinder adhesion of said third layer to said second layer.

16. The multi-layer structural body according to claim 15, wherein said third layer is a mixture of at least two polyolefins, including poly-4-methyl-pentene-1 or a resin containing poly-4-methyl-pentene-1 as a main component in a proportion not exceeding 50 wt %.

17. The multi-layer structural body according to claim 16, wherein said third layer is a mixture of at least two polyolefins, including poly-4-methyl-pentene-1 or a resin containing poly-4-methyl-pentene-1 as a main component in a proportion of 10–40 wt %.

18. The multi-layer structural body according to claim 1, wherein said third layer has a thickness of 10–100 μm.

19. A package including a multi-layer structural body, said multi-layer structural body comprising:
- a first layer resistant to gas permeation;
- a second layer laminated on said first layer and having a deoxidizing property; and
- a third layer which is gas permeable and laminated on said second layer, wherein said first layer has an oxygen permeability of less than 100 cc/m$^2$·day·atm (23° C., 100% RH), wherein said second layer comprises:
- a resin having an oxygen permeability coefficient of at least 200 cc·0.1 mm/m$^2$·day·atm (23° C., 100% RH);
- a granular oxygen absorber composition dispersed in said resin and including a deoxidation material undergoing a deoxidation reaction when exposed to moisture; and
- a moisture absorber dispersed in said resin, wherein said third layer has an oxygen permeability of at least 100 cc/m$^2$·day·atm (23° C., 100% RH), and wherein said first layer forms an outside surface of said package, and said third layer forms an inside surface of the said package.

20. The package according to claim 19, wherein said moisture absorber is calcium oxide.

21. The package according to claim 19, wherein said third layer is a mixture of at least two polyolefins, including poly-4-methyl-pentene-1 or a resin containing poly-4-methyl-pentene-1 as a main component in a proportion not exceeding 50 wt % for adhesion of said third layer to said second layer.

22. The multi-layer structural body according to claim 3, wherein the first layer comprises an ethylene-vinyl alcohol copolymer.

* * * * *